US012577368B2

(12) United States Patent
Werink et al.

(10) Patent No.: US 12,577,368 B2
(45) Date of Patent: Mar. 17, 2026

(54) OPAQUE POLYESTER-BASED MATERIALS

(71) Applicant: Holland Colours N.V., Apeldoorn (NL)

(72) Inventors: Johan Jozef Marinus Werink, Balkburg (NL); Johannes Henricus Hurenkamp, Utrecht (NL); Jules Caspar Albert Anton Roelofs, Twello (NL)

(73) Assignee: Holland Colours N.V., Apeldoorn (NL)

( * ) Notice: Subject to any disclaimer, the term of this patent is extended or adjusted under 35 U.S.C. 154(b) by 887 days.

(21) Appl. No.: 17/618,396

(22) PCT Filed: Jun. 15, 2020

(86) PCT No.: PCT/NL2020/050381
§ 371 (c)(1),
(2) Date: Dec. 10, 2021

(87) PCT Pub. No.: WO2020/251361
PCT Pub. Date: Dec. 17, 2020

(65) Prior Publication Data
US 2022/0282060 A1      Sep. 8, 2022

(30) Foreign Application Priority Data

Jun. 14, 2019      (EP) ..................................... 19180375

(51) Int. Cl.
*C08K 3/22*          (2006.01)
*B29C 49/00*          (2006.01)
(Continued)

(52) U.S. Cl.
CPC ............ *C08K 3/22* (2013.01); *B29C 49/0005* (2013.01); *B29C 49/6418* (2013.01);
(Continued)

(58) Field of Classification Search
CPC .............. C08K 3/22; C08K 2003/2241; B29C 49/0005; B29C 49/6418; B29C 49/786;
(Continued)

(56) References Cited

U.S. PATENT DOCUMENTS

2007/0059465 A1*   3/2007   Thompson ........... C08G 63/672
                                                            428/35.7
2013/0149479 A1*   6/2013   Otaki ................. C08G 63/6856
                                                            428/35.7
(Continued)

FOREIGN PATENT DOCUMENTS

EP          1 970 181 B1      1/2010
EP          3 023 458 A1      5/2016
(Continued)

OTHER PUBLICATIONS

International Search Report issued in PCT/NL2020/050381; mailed Sep. 11, 2020.
(Continued)

*Primary Examiner* — Anthony J Frost
(74) *Attorney, Agent, or Firm* — Studebaker Brackett PLLC

(57)          ABSTRACT
The invention discloses a preform for a container comprising a polyester, titanium dioxide, and a light absorbing additive. In addition, a process for preparing a polyester-based container from such a preform is disclosed, as well as a polyester-based container obtainable by such a process. The opaque containers can for instance be used for storing light-sensitive solids and/or liquids. The optical properties of the preform result in improved properties during blow-moulding processes.

22 Claims, 4 Drawing Sheets

Containers with 0.25 mm wall thickness

(51) Int. Cl.

| | |
|---|---|
| *B29C 49/64* | (2006.01) |
| *B29K 67/00* | (2006.01) |
| *B29K 105/00* | (2006.01) |
| *B29K 505/08* | (2006.01) |
| *B29L 31/00* | (2006.01) |

(52) U.S. Cl.

CPC .. *B29K 2067/00* (2013.01); *B29K 2105/0032* (2013.01); *B29K 2505/08* (2013.01); *B29K 2995/0025* (2013.01); *B29K 2995/0027* (2013.01); *B29L 2031/712* (2013.01); *C08K 2003/2241* (2013.01)

(58) Field of Classification Search

CPC ........ B29K 2067/00; B29K 2105/0032; B29K 2505/08; B29K 2995/0025; B29K 2995/0027; B29L 2031/712; C08L 67/00
See application file for complete search history.

(56) References Cited

U.S. PATENT DOCUMENTS

| | | | | |
|---|---|---|---|---|
| 2017/0306143 A1* | 10/2017 | Li | ......................... | B65D 1/0207 |
| 2017/0368762 A1* | 12/2017 | Gautam | .............. | B29C 65/1635 |

FOREIGN PATENT DOCUMENTS

| | | | |
|---|---|---|---|
| ES | 2 303 777 A1 | 8/2008 |
| JP | 3112086 B2 | 11/2000 |
| WO | 2011/040905 A1 | 4/2011 |

OTHER PUBLICATIONS

Barbara Gerstendoerfer-Hart et al. "Schnelle Erwaermung mit dem NIR-Verfahren" Kunststoffe, XP-000958169, Carl Hanser Verlag—ISSN 0023-5563, Jun. 1, 1999, pp. 62-64, vol. 89, No. 6, Munchen, Germany.

* cited by examiner

OPAQUE POLYESTER-BASED MATERIALS

The invention is in the field of opaque polyester-based materials. More specifically, the invention is directed to a preform for a container, to a process for preparing a container, to a container, and to a process for preparing a preform for a container.

Plastics are used for many applications, including packaging applications, owing to their properties such as strength, light weight and durability. Polyester-based plastics, such as polyethylene terephthalate (PET) are widely used for the production of containers for storing solids or liquids, such as bottles. These bottles and other containers can be used for packaging food or drinks, and many other materials. An important process for the manufacturing of polyester-based containers is blow-moulding of heated polyester-based preforms.

When the contents of a container or bottle are sensitive to degradation due to the exposure to ultraviolet and/or visible light, it is desirable that the container is opaque in the ultraviolet and visible region of the electromagnetic spectrum. Examples of products that include such light sensitive compounds are dairy products, such as milk. To this end, a light barrier needs to be added to the container in order to protect the contents from degradation. This light barrier can for example be achieved by mixing a colourant into the polyester, or by putting a light protective film (for instance containing a colourant) around the container. Another way of protecting light sensitive contents from degradation may be by using a multilayer container instead of a monolayer container. Such a multilayer container can comprise, for example, different colourants and/or different polymers in different layers.

Opacity is often imparted to containers with the use of pigments and/or dyes. Pigments and/or dyes of many different colours can be applied. In case of the production of white containers, titanium oxide is typically used as pigment. Application of titanium dioxide as pigment results in a material that reflects the majority of the incoming ultraviolet and visible light. However, for thin plastic containers, titanium oxide alone often does not lead to the required opacity, and a portion of the incoming light is still transmitted by the material. Therefore, in order to produce white opaque containers, additional colourants are added, which absorb the ultraviolet and visible light that is not reflected by titanium dioxide, while maintaining a white appearance. Typically, black pigments and/or dyes, such as carbon black, graphite, iron oxide and aluminium powder are used as light absorbers for white bottles.

Opaque containers or materials for the production of such containers are described for instance in EP-B-1 970 181, in which a preform with at least two layers is described. Each layer consists of a composition of polyethylene terephthalate (PET), titanium dioxide ($TiO_2$) and a dye with light-absorbing capacity between 400 nm and 700 nm.

JP-B-3 112 086 describes a resin composition comprising polyester, light reflective pigment and light absorbing pigment, for blow moulded bottles.

U.S. Pat. No. 9,382,028 describes stretch-blow-moulded opaque polyester containers comprising aluminium powder as opacifying material and an oxygen scavenger. The container has less than 15% transmission of visible light at 0.4 mm thickness.

EP-B-2 151 472 describes a resin composition comprising polyethylene terephthalate, titanium dioxide and iron oxide for food containers and preforms.

U.S. Pat. No. 6,034,167 discloses a polyester resin comprising graphite to reduce reheat times for blow moulding processes.

In U.S. Pat. No. 4,408,004, high clarity, low haze polyester, comprising carbon black in order to reduce infrared heat-up times, is disclosed.

Problems are often encountered with the manufacturing of opaque containers using processes such as blow moulding. The process window for blow moulding of opaque preforms is smaller, meaning that the process is more sensitive to factors such as process conditions and thickness of the preform used for blow moulding. Specifically, during heating of the polyester-based material, large temperature differences are observed between the inside and outside of the preforms. In *Technology of Plastics Packaging for the Consumer Market*; Giles, G. A., Bain, D. R., Eds.; Sheffield Academic Press; Sheffield; 2001, the process of reheating and blow moulding of preforms and, amongst others, the importance of the temperature profile during this process is explained in more detail. In case multilayer preforms with differently coloured layers are used, temperature differences are even more pronounced.

It is an objective of the present invention to at least partially overcome the problems associated with blow moulding of opaque polyester preforms, and to provide materials with an improved process window for blow moulding.

The inventors surprisingly found that this object can, at least in part, be met by a preform having specific optical properties.

Accordingly, in a first aspect of the invention there is provided a preform for a container, said preform comprising:

a polyester, titanium dioxide, a light absorbing additive;

wherein said preform has a transmittance at 550 nm of 0.1% or less and a transmittance at 1300 nm of 0.5% or more, wherein the transmittance is measured at 2 mm sample thickness.

Alternatively, the preform according to the invention is defined as a preform for a container, said preform comprising:

a polyester, titanium dioxide, a light absorbing additive;

wherein said preform has an absorption at 550 nm of 25% or more and an absorption at 1300 nm of 20% or less, wherein the absorption is measured at 2 mm sample thickness.

Figure 1:
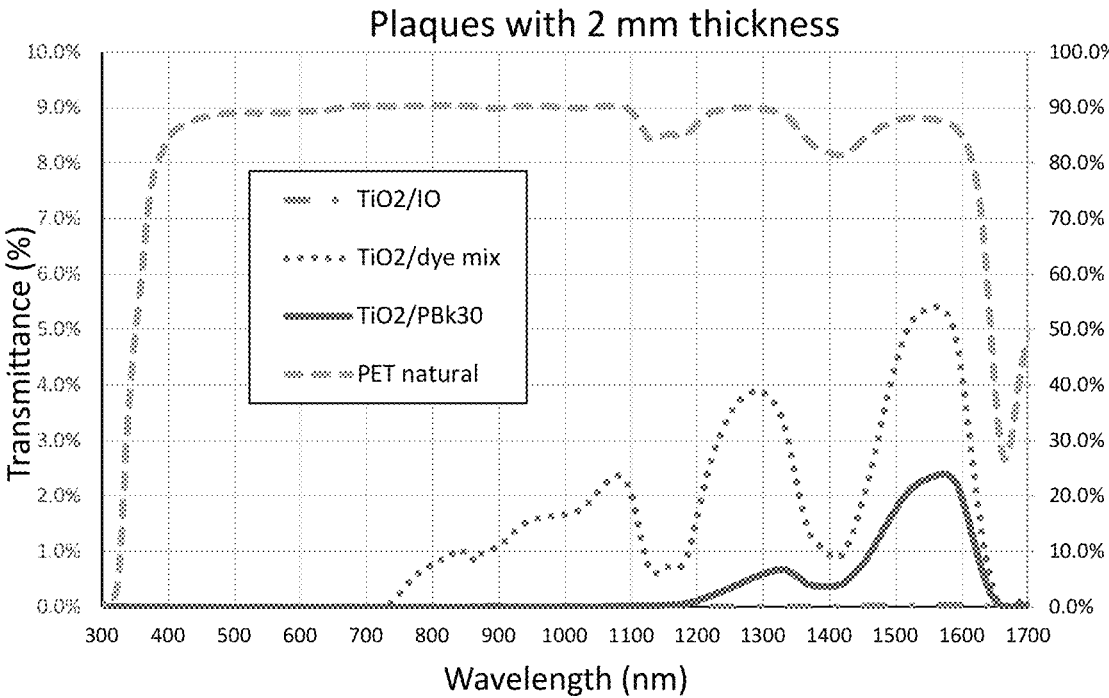
FIG. 1 depicts the transmittance curves of plaques with 2 mm thickness. The plots are of $TiO_2$/IO; $TiO_2$/dye mix; $TiO_2$/PBk30; and PET natural (or natural PET).

The invention is directed to a preform for a container. Typically, such a container is suitable for storing solids and/or liquids. The composition of the preform results in improved behaviour in blow moulding processes. Without wishing to be bound by any theory, the inventors believe that the improved process window during blow moulding of opaque preforms according to the invention is the result of their optical properties in the near-infrared (NIR) region.

In general, blow moulding processes comprise a heating step, in which the polyester is heated using a NIR radiation source which typically emits light in the range of 1000-1600 nm. Polyesters typically have absorption bands in the NIR region in the range of 1000-1600 nm. Therefore, polyester materials absorb NIR radiation, which results in heating of the material.

In case a light absorber is added to a preform in order to impart opacity in the ultraviolet (UV) and/or visible region, the NIR absorption properties are generally affected as well. Light absorbers that are typically used in opaque containers, such as iron oxide, graphite, carbon black and aluminium powder, absorb light in the UV and visible region, as well as in the NIR region. For this reason, these light absorbers can be used as reheat agents, which are applied in the art in order to accelerate NIR heating of transparent polyester materials.

However, the disadvantage of these light absorbers in reheating opaque preforms is that they may lead to inhomogeneous heating of the polyester material. In the case of heating a preform for a container that contains these light absorbers using NIR radiation, a large fraction of the total radiation is absorbed in a thin section of the preform facing the NIR source, typically the outside of the preform. Therefore, less NIR radiation can reach the remainder of the preform. This effect results in relatively large temperature differences between the inside and the outside of the preform during NIR heating and subsequently in problems in blowing of the preforms in opaque containers.

The light absorbing additives that are comprised in the preform according to the invention allow imparting opacity in the ultraviolet and visible region, while maintaining a high level of transparency in the NIR region.

The degree of opacity or transparency of the preform can be expressed in terms of transmittance. Transmittance, as used herein, refers to the percentage of light of a specified wavelength that is transmitted by a sample of a specified thickness, such as a preform or container, and can be measured using a spectrometer.

In case the degree of opacity or transparency of the preform is expressed in terms of transmittance, the transmittance of the preform at 550 nm is 0.1% or less, when measured at 2 mm sample thickness. Preferably, the transmittance at 550 nm is 0.1% or less, more preferably 0.05% or less, such as 0.03% or less, or 0.01% or less.

The transmittance of the preform of the invention at 1300 nm is 0.5% or more, when measured at 2 mm sample thickness. Preferably, the transmittance is 1% or more, more preferably 2% or more, such as 3% or more, or 5% or more. The transmittance of the preform at 1300 nm may be as high as 15%, but is preferably less.

The transmittance of the preform at 1300 nm may be at least 0.5 percentage point higher than the transmittance of the preform at 550 nm when measured at 2 mm sample thickness. Preferably, the transmittance at 1300 nm is at least 1.0 percentage point higher than the transmittance at 550 nm, more preferably at least 2.0 percentage point higher, such as 3.0 percentage point higher, or 5.0 percentage point higher.

Alternatively, the degree of opacity or transparency can be expressed in terms of absorption. Absorption, as used herein, refers to the percentage of light of a specified wavelength that is absorbed by a sample of a specified thickness. Absorption is calculated using the following formula:

$$\text{absorption (\%)} = 100\% - \text{transmittance (\%)} - \text{reflection (\%)}$$

wherein reflection refers to the percentage of light of a specified wavelength that is reflected by the sample of a specified thickness, which can be measured using a spectrometer.

In case the degree of opacity or transparency of the preform is expressed in terms of absorption, the absorption of the preform at 550 nm is 25% or more, when measured at 2 mm sample thickness. Preferably, the absorption at 550 nm is 27% or more, more preferably 28% or more, such as 29% or more, or 30% or more.

According to this definition, the absorption of the preform of the invention at 1300 nm is 20% or less, when measured at 2 mm sample thickness. Preferably, the absorption is 15% or less, more preferably 10% or less, such as 7% or less, or 5% or less. The absorption of the preform at 1300 nm may be as low as 2%, but is preferably more.

The absorption of the preform at 1300 nm may be at least 10 percentage point less than the absorption of the preform at 550 nm when measured at 2 mm sample thickness. Preferably, the absorption at 1300 nm is at least 15 percentage point less than the absorption at 550 nm, more preferably at least 20 percentage point less, such as 25 percentage point less, or 30 percentage point less.

Suitable light absorbing additives may comprise one or more organic compounds, inorganic compounds, or any mixture thereof. Examples of organic compounds include but are not limited to Solvent Yellow 43 (CAS number 19125-99-6/1226-96-9), Solvent Yellow 72 (CAS number 61813-98-7), Solvent Yellow 93 (CAS number 4702-90-3/61969-52-6), Solvent Yellow 114 (CAS number 75216-45-4), Disperse Yellow 64 (CAS number 10319-14-9), Disperse Yellow 201 (CAS number 80748-21-6), Disperse Yellow 241 (CAS number 83249-52-9), Solvent Violet 36 (CAS number 61951-89-1), Solvent Red 23 (CAS number 85-86-9), Solvent Red 26 (CAS number 477-79-6), Solvent Red 111 (CAS number 82-38-2), Solvent Red 135 (CAS number 71902-17-5), Solvent Red 149 (CAS number 71902-18-6/21295-57-8), Solvent Red 179 (CAS number 89106-94-5), Solvent Red 195 (CAS number 164251-88-1), Solvent Red 207 (CAS number 15958-68-6), Solvent Green 3 (CAS number 128-80-3), Solvent Green 28 (CAS number 71839-01-5), Disperse Blue 60 (CAS number 12217-80-0), Solvent Blue 36 (CAS number 14233-37-5), Solvent Blue 97 (CAS number 61969-44-6), Solvent Blue 101 (CAS number 6737-68-4), Solvent Blue 104 (CAS number 116-75-6), Solvent Orange 60 (CAS number 61969-47-9/6925-69-5), Disperse Orange 47 (CAS number 12236-03-2), Solvent Black 7 (CI number 50415:1, CAS number 8005-02-5), Pigment Blue 15:1 (CI number 74160, CAS number 147-14-8), Pigment Blue 15:3 (CI number 74160, CAS number 147-14-8), Pigment Green 7 (CI number 74260, CAS number 1328-

53-6), Pigment Orange 43 (CI number 71105, CAS number 4424-06-0), Pigment Orange 64 (CI number 12760, CAS number 72102-84-2), Pigment Orange 72 (CI number 211095, CAS number 78245-94-0), Pigment Red 122 (CI number 73915, CAS number 980-26-7), Pigment Red 144 (CI number 20735, CAS number 5280-78-4), Pigment Red 149 (CI number 71137, CAS number 4948-15-6), Pigment Red 177 (CI number 65300, CAS number 4051-63-2), Pigment Red 178 (CI number 71155, CAS number 3049-71-6), Pigment Red 179 (CI number 71130, CAS number 5521-31-3), Pigment Red 187 (CI number 12486, CAS number 59487-23-9), Pigment Red 202 (CI number 73907, CAS number 3089-17-6), Pigment Red 214 (CI number 200660, CAS number 40618-31-3), Pigment Red 220 (CI number 20055, CAS number 68259-05-2), Pigment Red 242 (CI number 20067, CAS number 52238-92-3), Pigment Red 247 (CI number 15915, CAS number 43035-18-3), Pigment Red 254 (CI number 56110, CAS number 84632-65-5), Pigment Red 264 (CI number 561300, CAS number 88949-33-1), Pigment Violet 19 (CI number 73900, CAS number 1047-16-1), Pigment Violet 23 (CI number 51319, CAS number 6358-30-1), Pigment Violet 29 (CI number 71129, CAS number 81-33-3), Pigment Yellow 109 (CI number 56284, CAS number 5045-40-9), Pigment Yellow 110 (CI number 56280, CAS number 5590-18-1), Pigment Yellow 119 (CI number 77496, CAS number 68187-51-9), Pigment Yellow 128 (CI number 20037, CAS number 79953-85-8), Pigment Yellow 138 (CI number 56300, CAS number 30125-47-4), Pigment Yellow 147 (CI number 60645, CAS number 4118-16-5), Pigment Yellow 151 (CI number 13980, CAS number 31837-42-0), Pigment Yellow 180 (CI number 21290, CAS number 77804-81-0), Pigment Yellow 181 (CI number 11777, CAS number 74441-05-7), Pigment Yellow 183 (CI number 18792, CAS number 65212-77-3) Pigment Yellow 191 (CI number 18795, CAS number 129423-54-7), Pigment Yellow 53 (CI number 77788, CAS number 8007-18-9), Pigment Yellow 62 (CI number 13940, CAS number 12286-66-7), Pigment Yellow 95 (CI number 20034, CAS number 5280-80-8), Pigment Blue 60 (CI number 69800, CAS number 81-77-6). Suitable organic light absorbing additives are for example commercially available from companies like Milliken or Clariant.

Examples of inorganic light absorbing additives that may reduce the transmittance of the portion of UV and visible light may comprise one or more oxides comprising metals or elements selected from the group consisting of Na, Al, Si, S, Zn, Ni, Fe, Mn, Ti, V, Bi, Co, Cr, Cu, Sn, and Sb. Furthermore, pigments selected from the group consisting of Pigment Black 26 (CI number 77494, CAS number 68186-94-7), Pigment Brown 24 (CI number 77310, CAS number 68186-90-3), Pigment Brown 29 (CI number 77500, CAS number 12737-27-8), Pigment Green 36 (CI number 74265, CAS number 14302-13-7), Pigment Green 50 (CI number 77377, CAS number 68186-85-6), Pigment Red 101 (CI number 77491, CAS number 1332-37-2), Pigment Black 28 (CI number 77428, CAS number 68186-91-4), Pigment Black 29 (CI number 77498, CAS number 68187-50-8), Pigment Black 30 (CI number 77504, CAS number 71631-15-7), Pigment Black 33 (CI number 77537, CAS number 68186-94-7 or 75864-23-2), Pigment Brown 29 (CI number 77500, CAS number 12737-27-8), Pigment Brown 33 (CI number 77503, CAS number 68186-88-9), Pigment Blue 29 (CI number 77007, CAS number 057455-37-5), Pigment Blue 28 (CI number 77346, CAS number 1345-16-0), Pigment Blue 36 (CI number 77343, CAS number 68187-11-1), Pigment Green 17 (CI number 77288, CAS number 1308-38-9), Pigment Yellow 164 (CI number 77899, CAS number 68412-38-4), Pigment Yellow 184 (CI number 771740, CAS number 14059-33-7), Pigment Yellow 42 (CI number 77492, CAS number 51274-00-1), and mixtures thereof may be present in the concentrate to improve the light protection property in the visual and ultraviolet range but having transparency in the NIR range. The pigments are for example commercially available from companies like The Shepherd Color Company or Ferro Corporation.

The polyester comprised in the preform of the invention may be selected from the group of aliphatic homopolymer polyesters, aliphatic copolymer polyesters, semi-aromatic homopolymer polyesters, semi-aromatic copolymer polyesters, aromatic homopolymer polyesters, and aromatic copolymer polyesters. Suitable polyesters include a condensation product of a diprotic acid and a glycol, such as a condensation product of i) a dicarboxylic acid or an anhydride and ii) a glycol. Typically, the diprotic acid comprises an aromatic diprotic acid, or ester or anhydride thereof, such as isophthalic acid, terephthalic acid, naphthalene-1,4-dicarboxylic acid, naphthalene-2,6-dicarboxylic acid, phthalic acid, phthalic anhydride, tetrahydrophthalic anhydride, trimellitic anhydride, diphenoxyethane-4,4'-dicarboxylic acid, diphenyl-4,4'-dicarboxylic acid, and mixtures thereof. The diprotic acid also can be an aliphatic diprotic acid or anhydride, such as adipic acid, sebacic acid, decane-1,10-dicarboxylic acid, fumaric acid, succinic anhydride, succinic acid, cyclohexanediacetic acid, glutaric acid, azelaic acid, and any mixture thereof. Other known aromatic and aliphatic diprotic acids may also be used. Preferably the diprotic acid comprises an aromatic diprotic acid, optionally in combination with an aliphatic diprotic acid.

The glycol, or diol, component of the polyester may comprise ethylene glycol, propylene glycol, butane-1,4-diol, diethylene glycol, a polyethylene glycol, a polypropylene glycol, neopentyl glycol, a polytetramethylene glycol, 1,6-xylene glycol, pentane-1,5-diol, 3-methylpentanediol-(2,4), 2-methylpentanediol-(1,4), 2,2,4-trimethylpentanediol-(1, 3), 2-ethylhexanediol-(1,3), 2,2-diethylpropanediol-(1,3), hexanediol-(1,3), 1,4-bis(2-hydroxyethoxy)benzene, 2,2-bis (4-hydroxycyclohexyl)propane, 2,4-dihydroxy-1,1,3,3-tetramethylcyclobutane, 2,2-bis(3-hydroxyethoxyphenyl)propane, 2,2-bis(4-hydroxypropoxyphenyl)propane, 1,4-dihydroxymethylcyclohexane, and any mixture thereof. Other known glycols may as well be used as glycol component of the polyester.

Preferably the polyester comprises polyethylene terephthalate (PET). Virgin bottle grade polyethylene terephthalate can be used, but also postconsumer polyethylene terephthalate, or polyethylene terephthalate glycol-modified (PETG). Other polyesters that may be comprised in the preform include polyethylene naphthalate, polybutylene terephthalate, polyethylene furanoate, and polylactic acid.

The polyester may be present in the preform of the invention in an amount of 80% or more by total weight of the preform, preferably 85% or more, such as 90% or more. The polyester may be present in an amount of 90-98%, by total weight of the preform, preferably 91-97%, more preferably 92-96%.

The polyester may have an intrinsic viscosity determined according to ASTM D4603 of 0.2-1.2 dl/g, preferably 0.6-0.9 dl/g, for an average 60/40 blend of phenol/1,1,2,2-tetrachloroethane solvent mixture.

The preform of the invention further comprises titanium dioxide. The titanium dioxide and be present in various forms, including ilmenite, rutile, anatase, brookite, akaogiite, metastable phases, high pressure forms, or any mixture thereof. Preferably, the titanium dioxide is present as rutile, anatase, or any mixture thereof. Suitable grades of titanium dioxide are, for example, commercially available from companies like DuPont, Crystal and Kronos.

The titanium dioxide may be present in the preform of the invention in an amount of 0.5-14% by total weight of the preform, such as 1-10%, 1-8%, or 1.5-4%.

The preform of the invention may further comprise polymethylpentene and/or cyclic olefin polymer. Advantageously, in a preform comprising polymethylpentene and/or cyclic olefin polymer, less titanium dioxide and/or light absorbing additive has to be present in order to achieve the desired opacity in the ultraviolet and visible region.

The polymethylpentene may generally be considered a 4-methyl-1-pentene-based polyolefin, having the monomeric unit with the chemical formula $(C_6H_{12})_n$, wherein n is 5-200, preferably 6-100. The monomeric unit can homopolymerise and/or copolymerise with linear and/or branched aliphatic and/or aromatic compounds. Suitable examples of comonomers include ethylene and 1-decene. Polymethylpentene can, for example, commercially be obtained from Mitsui Chemicals. The polymethylpentene may be a homopolymer, a copolymer, or a mixture thereof. Polymethylpentene typically has a melting point $T_m$ of 220-250° C., such as 220-240° C.

The polymethylpentene may be present in the preform of the invention in an amount of 10% or less by total weight of the preform. The preferred amount at which polymethylpentene may be present in the preform is 9% or less by total weight of the preform, such as 8% or less, 7% or less, 6% or less, 5% or less, 4% or less, 3% or less, 2% or less, or 1% or less. Preferably, polymethylpentene is present in an amount of 0.5% or more by total weight of the preform. The most preferred amount of polymethylpentene is from 1% to 5% by total weight of the preform.

The cyclic olefin polymer that may be comprised in the preform of the invention may be a cyclic olefin homopolymer, a cyclic olefin copolymer, or any mixture thereof. Cyclic olefin copolymers are produced by copolymerisation of e.g. ethylene with a cyclic olefin monomer, such as norbornene, phenyl norbornene, dihydro dicyclopentadiene, and tetracyclododecene, tetracyclododecene norbornene, dicyclopentadiene, dimethyloctahydronaphthalene, cyclopentene, dicyclopentadiene, or derivatives thereof. Ziegler-Natta and metallocene catalysts are commonly used in polymerisation processes.

Cyclic olefin homopolymers may, for example, comprise one or more of the above-mentioned cyclic olefin monomers. In particularly, norbornene, norbornene derivatives, cyclopentene, and cyclopentene derivatives are preferred monomers.

Cyclic olefin copolymers comprise one or more monomeric units of an aliphatic olefin and one or more units of a cyclic olefin. The aliphatic olefin monomer may, for example, comprise one or more selected from the group consisting of ethylene, propylene, 1-butene, 1-pentene, 1-hexene, 1-heptene, 1-octene, and 1-nonene. Preferably, the aliphatic olefin monomer is ethylene and/or propylene. The cyclic olefin monomer may, for example, comprise one or more selected from the group consisting of norbornene, phenyl norbornene, tetracyclododecene norbornene, dicyclopentadiene, dimethyloctahydronaphthalene, and cyclopentene. Preferably, the cyclic olefin monomer comprises one or more of norbornene, norbornene derivatives, cyclopentene, and cyclopentene derivatives. The aliphatic olefin monomer and cyclic olefin monomer may further copolymerise with linear and/or branched aliphatic and/or aromatic compounds. Suitable cyclic olefin copolymers are, for example, commercially available from Mitsui Chemicals, and TOPAS Advanced Polymers.

The cyclic olefin polymer may comprise a mixture of one or more cyclic olefin homopolymers and one or more cyclic olefin copolymers in a weight ratio of 1:20 to 20:1. In particular the weight ratio between cyclic olefin homopolymers and cyclic olefin copolymers may be 1:10 to 10:1. Preferably, the weight ratio is 1:5 to 5:1.

The cyclic olefin polymer may have a melting point $T_m$ of 75-500° C., such as 100-450° C., or 120-400° C. Preferably, the cyclic olefin polymer has a melting point of 125-350° C.

The cyclic olefin polymer may have a glass transition point $T_g$ of 75-250° C., such as 145-235° C. Preferably, the cyclic olefin polymer has a glass transition point of 155-225° C.

The cyclic olefin polymer may be present in the preform in an amount of 0.5-9% by total weight of the preform, preferably 1-8%, more preferably 1-7%.

The preform of the invention may optionally comprise further additives that do not adversely affect the desirable properties of the preform, or container prepared therefrom. Examples of such further additives include stabilisers, antioxidants, visible light screening agents, UV light screening agents, extrusion aids, oxygen scavengers, acetaldehyde scavengers, drying agents, fillers, anti-clogging agents, crystallisation aids, impact modifiers, additives designed to make the polymer more (bio-)degradable or combustible, and any mixture thereof. If present, the total amount of such further additives may be 7% or less, by total weight of the preform, such as 1-7%, or 2-5%.

The preform may comprise an amount of titanium dioxide of 10% or less by total weight of the preform. In particular, the amount at which titanium dioxide is present in the preform is 9% or less by total weight of the preform, such as 8% or less, 7% or less, 6% or less, 5% or less, 4% or less, 3% or less, 2% or less, or 1% or less. Preferably, titanium dioxide is present in an amount of 0.5% or more by total weight of the preform. More preferably the amount of titanium dioxide is 0 to 8% by total weight of the preform, such as 0 to 4%.

When the amount of titanium dioxide is above 10% by total weight of the preform, physical properties of the preform may be negatively influenced, such as blowing of a preform and mechanical properties of both the container as well as the polymer may be hampered. When the amount of titanium dioxide is above 4% by total weight of the preform, multilayer structures may not be necessary to obtain desired light protection for containers. When titanium dioxide is absent in the preform, the light-shielding property is negatively influenced and higher amounts of for example cyclic olefin polymer are needed, resulting in higher costs and subsequently fewer ideal properties.

The preform may comprise one or more layers. In case the preform comprises more than one layer, the titanium dioxide and the light absorbing additive, as well as the optional polymethylpentene and/or cyclic olefin polymer, may be comprised in the same layer. Alternatively, the titanium dioxide and the light absorbing additive, as well as the optional polymethylpentene and/or cyclic olefin polymer may be present in different layers.

Preferably, the titanium dioxide and the light absorbing additive, as well as the optional polymethylpentene and/or cyclic olefin polymer contained in the preform of the invention are homogeneously dispersed in the polyester matrix within a single layer.

In a further aspect, the invention is directed to a process for preparing a polyester-based container, said process comprising the steps of:

heating a preform as described herein using a near-infrared (NIR) radiation source, and moulding the preform into a container.

The containers may be prepared by blow moulding, such as extrusion blow moulding, one stage injection stretch blow moulding or two stage injection stretch blow moulding.

During the heating step, the opaque preform may be heated to an average temperature above the glass transition temperature of the polyester in the range of 80–130° C., preferably 85-120° C., more preferably 90-110° C.

Other parameter important for blowing preforms into containers are described in *Technology of Plastics Packaging for the Consumer Market*; Giles, G. A., Bain, D. R., Eds.; Sheffield Academic Press; Sheffield; 2001, in more detail.

Preferably, the temperature difference between the outside of the preform, which faces the NIR radiation source, and the inside of the preform is 20° C. or less during the heating step when measured on a preform of 3 mm thickness, preferably 17° C. or less, such as 15° C. or less.

In another aspect, the invention is directed to a container obtainable by the process as described herein.

The container may have a transmittance at 550 nm of 1% or less, when measured at a sample thickness of 0.25 mm, preferably 0.8% or less, such as 0.6% or less. Preferably, the container has a transmittance at 550 nm of 0.1-2%, more preferably 0.3-1.5%, such as 0.5-1.0%.

The invention has been described by reference to various embodiments, and methods. The skilled person understands that features of various embodiments and methods can be combined with each other.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art. For the purpose of clarity and a concise description features are described herein as part of the same or separate embodiments, however, it will be appreciated that the scope of the invention may include embodiments having combinations of all or some of the features described.

Hereinafter, the invention will be illustrated in more detail, according to specific examples. However, the invention may be embodied in many different forms and should not be construed as being limited to the embodiments set forth herein. Rather, these example embodiments are provided so that this description will be thorough and complete, and will fully convey the scope of the invention to those skilled in the art.

EXAMPLES

Example 1

Concentrates with $TiO_2$, PET carrier polymer and light absorbing additives were produced on a Kraus Maffei Berstorff ZE 25Rx46D twin screw extruder with a temperature profile of 270-280° C. Carrier resin content was typically 35%, whereas the combined content of $TiO_2$ and light absorbing additives was typically 65%.

With the concentrates, plaques with dimensions 60 mm×53 mm×2 mm were prepared by adding 10 wt. % of the concentrate to polyester (Invista T94N PET resin, IV=0.84 dl/g), using an Arburg 221K Allrounder 350-100. The extruder temperature profile was set to 285° C. All plaques contained enough opacifier and light absorbing additive to have a transmittance value of zero between 300-700 nm. The transmittance curves from 300 to 1700 nm of the opaque plaques were collected using a Shimadzu UV3600 plus spectrometer equipped with an ISR 1503 integrating sphere and are plotted in FIG. 1. For comparison, natural PET was added to the graph, which spectrum is plotted on the secondary y-axis with transmittance values of 0-100%.

Table 1 shows the composition of the four plaques and transmittance values. Cleary can be seen that samples 3 and 4 have a higher transmittance at 1300 nm than sample 2, whereas the transmittance at 550 nm is zero for all three opaque samples.

TABLE 1

| Sample | Opacifier | Light absorber | % T @ 550 nm | % T @ 1300 nm |
|---|---|---|---|---|
| 1* | Natural PET | none | 89 | 90 |
| 2* | $TiO_2$ | iron oxide (IO) | <0.01 | 0.01 |
| 3 | $TiO_2$ | dye mix of SR 135, SG 3 | <0.01 | 3.9 |
| 4 | $TiO_2$ | PBk 30 | <0.01 | 0.6 |

*= comparative

Example 2

Preforms for a container were made from the materials from Example 1. The concentrates were used to produce polyester (PET) preforms (Invista T94N resin, IV=0.84 dl/g). The 25 g preforms for 0.5 litre bottles with PCO neck finish were produced using an Arburg Allrounder 320, equipped with a Piovan T200 dryer and DB-60 control unit, with extruder temperature profile and hot runner temperatures set at 285° C. PET was dried to a dew point of –45° C. Dosing of the concentrates at 10 wt. % was done using a Movacolor MCBalance.

Preforms were heated on a Corpoplast LB01 using the same PET bottle blowing settings for all preforms. After heating, the preform was transported and instantly measured on a Thermoscan 3D from Blow Moulding Technologies to determine the inside and outside temperature of the heated preform. Table 2 shows the temperature difference between the inside and the outside of the preforms with a wall thickness of 3.0 mm, during heating using NIR radiation.

TABLE 2

| Preform no. | composition | Outside temperature (° C.) | Inside temperature (° C.) | Δ T (° C.) |
|---|---|---|---|---|
| 1* | PET, TiO$_2$, IO | 120 | 94 | 26 |
| 2 | PET, TiO$_2$, dye mix | 106 | 93 | 13 |
| 3 | PET, TiO$_2$, PBk30 | 112 | 92 | 20 |

*= comparative

Example 3

Concentrates with TiO$_2$, polymethylpentene (PMP) carrier, polymer and light absorbing additives were produced on a Kraus Maffei Berstorff ZE 25Rx46D twin screw extruder with a temperature profile of 270-280° C. Carrier resin content was typically 35%, whereas the combined content of TiO$_2$ and light absorbing additives was typically 65%.

Figure 2:
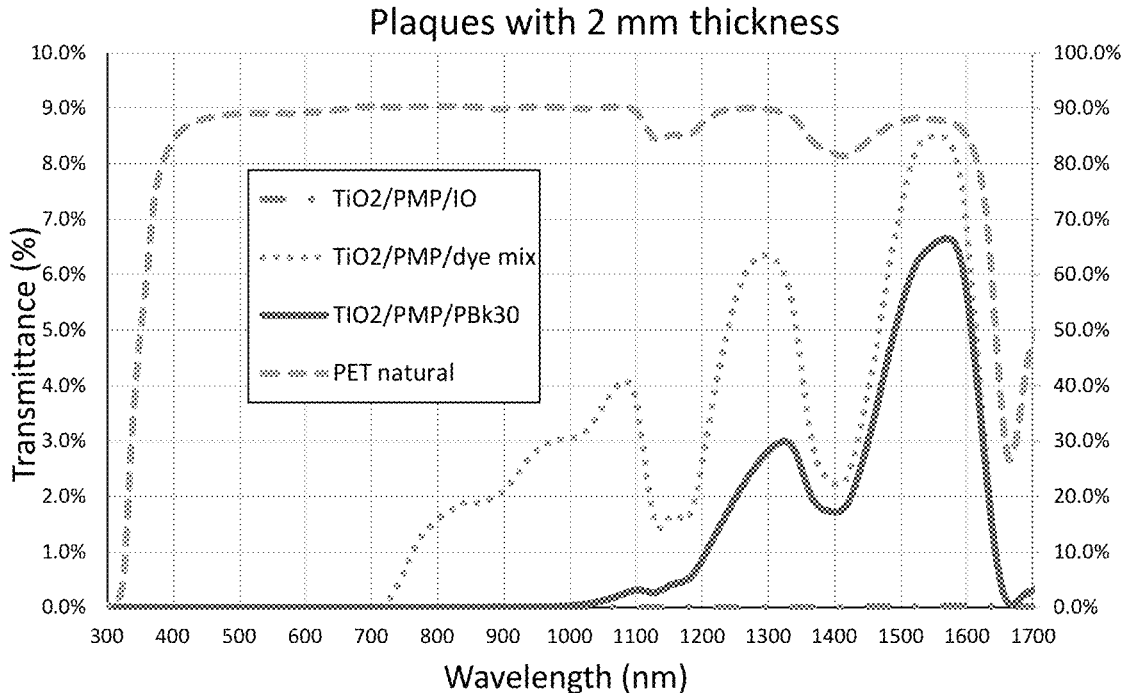
FIG. 2 depicts the transmittance curves of plaques with 2 mm thickness. The plots are of $TiO_2$/PMP/IO; $TiO_2$/PMP/dye mix; $TiO_2$/PMP/PBk30; and PET natural (or natural PET).

With the concentrates, plaques with dimensions 60 mm×53 mm×2 mm were prepared by adding 6 wt. % the concentrate to polyester (Invista T94N PET resin, IV=0.84 dl/g) using an Arburg 221K Allrounder 350-100. The extruder temperature profile was set to 285° C. All plaques contained enough opacifier and light absorbing additive to have a transmittance value of zero between 300-700 nm. The transmittance curves from 300 to 1700 nm of the opaque plaques were collected using a Shimadzu UV3600 plus spectrometer equipped with an ISR 1503 integrating sphere and are plotted in FIG. 2. For comparison, natural PET was added to the graph, which spectrum is plotted on the secondary y-axis with transmittance values of 0-100%.

Table 3 shows the composition of the four plaques and transmittance values. Cleary can be seen that samples 6 and 7 have a higher transmittance at 1300 nm than sample 5, whereas the transmittance at 550 nm is zero for all three opaque samples.

TABLE 3

| Sample | Opacifier | Light absorber | % T @ 550 nm | % T @ 1300 nm |
|---|---|---|---|---|
| 1* | Natural PET | none | 89 | 90 |
| 5* | TiO$_2$, PMP | iron oxide (IO) | <0.01 | <0.01 |

TABLE 3-continued

| Sample | Opacifier | Light absorber | % T @ 550 nm | % T @ 1300 nm |
|---|---|---|---|---|
| 6 | TiO$_2$, PMP | dye mix of SR 135, SG 3 | <0.01 | 6.3 |
| 7 | TiO$_2$, PMP | PBk 30 | <0.01 | 3.9 |

*= comparative

Figure 3:
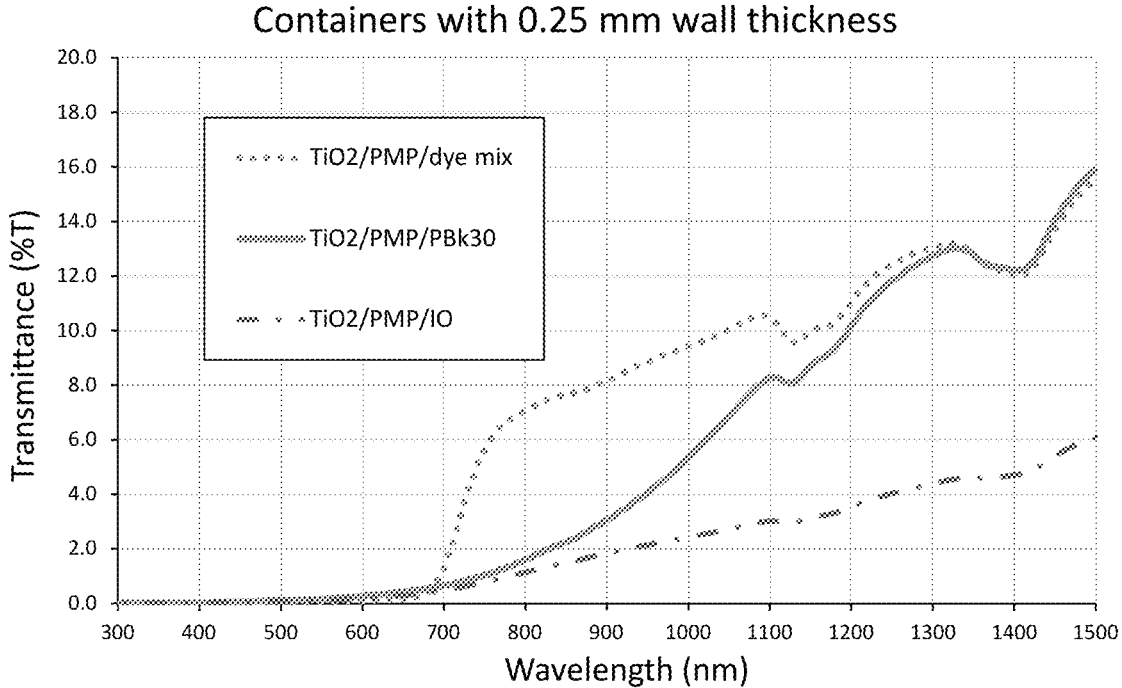
FIG. 3 depicts the transmittance curves of container with 0.25 mm thickness. The plots are of $TiO_2$/PMP/dye mix; $TiO_2$/PMP/PBk30; and $TiO_2$/PMP/IO.

Containers with a wall thickness of 0.25 mm were prepared in the following manner: preforms with typically 6 wt. % of the concentrates were heated on a Corpoplast LB01 using the same PET bottle blowing settings for all preforms. FIG. 3 shows the transmittance curves from 300 to 1500 nm of the blown containers measured using a Shimadzu UV3600 plus equipped with an ISR 1503 integrating sphere. The resulting containers maintain low transmittance at 550 nm after blowing.

Example 4

Preforms with 6 wt. % of the concentrates for a container were made from the materials from Example 3. The concentrates were used to produce polyester (PET) preforms (Invista T94N resin, IV=0.84 dl/g). The 25 g preforms for 0.5 litre bottles with PCO neck finish were produced using an Arburg Allrounder 320, equipped with a Piovan T200 dryer and DB-60 control unit, with extruder temperature profile and hot runner temperatures set at 285° C. PET was dried to a dew point of –45° C. Dosing of the concentrates was done using a Movacolor MCBalance.

Preforms were heated on a Corpoplast LB01 using the same PET bottle blowing settings for all preforms. After heating, the preform was transported and instantly measured on a Thermoscan 3D from Blow Moulding Technologies to determine the inside and outside temperature of the heated preform. Table 4 shows the temperature difference between the inside and the outside of the preforms with a wall thickness of 3.0 mm, during heating using NIR radiation.

TABLE 4

| Preform no. | Composition | Outside temperature (° C.) | Inside temperature (° C.) | Δ T (° C.) |
|---|---|---|---|---|
| 1* | PET, PMP, TiO$_2$, IO | 120 | 97 | 23 |
| 2 | PET, PMP, TiO$_2$, dye mix | 98 | 88 | 10 |
| 3 | PET, PMP, TiO$_2$, PBk30 | 106 | 90 | 16 |

*= comparative

Example 5

Analogous to Examples 3-4, preforms with cyclic olefin polymer (COP) as opacifier were produced and measured on a Thermoscan 3D from Blow Moulding Technologies to determine the inside and outside temperature of the heated preform. Table 4 shows the temperature difference between the inside and the outside of the preforms with a wall thickness of 3.0 mm, during heating using NIR radiation.

TABLE 5

| Preform no. | Composition | Outside temperature (° C.) | Inside temperature (° C.) | Δ T (° C.) |
|---|---|---|---|---|
| 1* | PET, COP, TiO$_2$, IO | 123 | 99 | 24 |
| 2 | PET, COP, TiO$_2$, dye mix | 110 | 96 | 13 |
| 3 | PET, COP, TiO$_2$, PBk30 | 113 | 96 | 17 |

*= comparative

Example 6

Concentrates with TiO$_2$, PET carrier polymer and light absorbing additives were produced on a Kraus Maffei Berstorff ZE 25Rx46D twin screw extruder with a temperature profile of 270-280° C. Carrier resin content was typically 40%.

Figure 4:
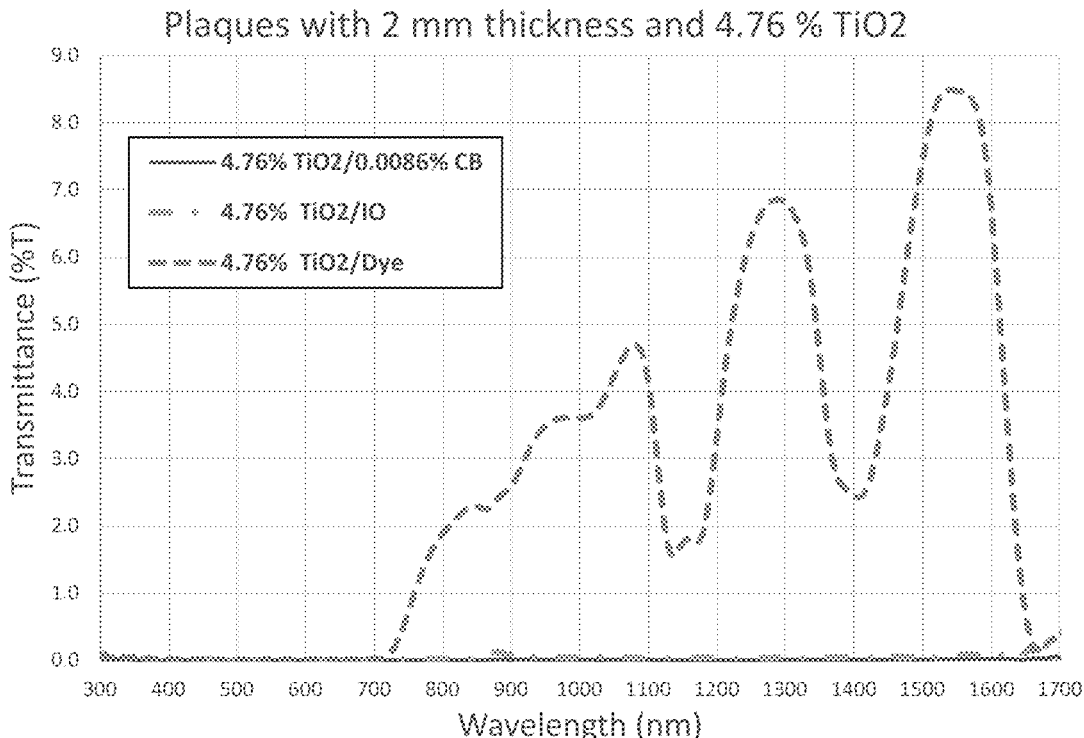
FIG. 4 depicts the transmittance curves of plaques with 2 mm thickness and 4.76% $TiO_2$. The plots are of 4.76% $TiO_2$/0.0086% CB; 4.76% $TiO_2$/IO; and 4.76% $TiO_2$/dye.
Figure 5:
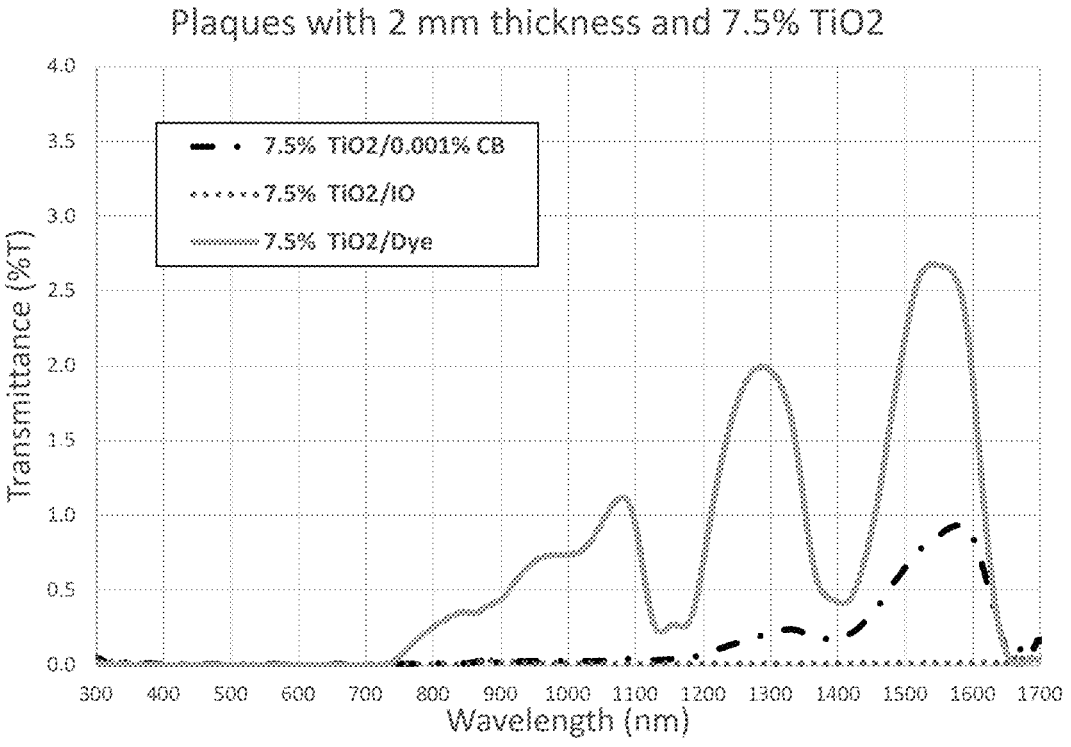
FIG. 5 depicts the transmittance curves of plaques with 2 mm thickness and 7.5% $TiO_2$. The plots are of 7.5% $TiO_2$/0.001% CB; 7.5% $TiO_2$/IO; and 7.5% $TiO_2$/dye.

With the concentrates, plaques with dimensions 60 mm×53 mm×2 mm were prepared by adding the concentrate to 8 gram polyester (Invista T94N PET resin, IV=0.84 dl/g), using an Arburg 221K Allrounder 350-100. The extruder temperature profile was set to 285° C. Transmittance curves from 300 to 1700 nm of the plaques were collected using a Shimadzu UV3600 plus spectrometer equipped with an ISR 1503 integrating sphere and are plotted in FIGS. 4 and 5.

Table 6 shows the composition of the seven plaques and transmittance values measured at 550 and 1300 nm. Cleary it can be seen that whereas comparative samples 12-14 all have a transmittance of <0.1% at 550 nm, none has a transmittance of 0.5% or more at 1300 nm.

TABLE 6

| Sample | Opacifier (wt. %) | Light absorber (wt. %) | % T @ 550 nm | % T @ 1300 nm |
|---|---|---|---|---|
| 8 | TiO$_2$ (4.76) | iron oxide (0.031) | <0.01 | 0.03 |
| 9 | TiO$_2$ (4.76) | dyes (0.014) | 0.01 | 6.8 |
| 10 | TiO$_2$ (7.5) | iron oxide (0.049) | <0.01 | 0.01 |
| 11 | TiO$_2$ (7.5) | dyes (0.022) | <0.01 | 2.8 |
| 12* | TiO$_2$ (7.5) | carbon black (0.001) | <0.01 | 0.2 |
| 13* | TiO$_2$ (10.5) | carbon black (0.001) | <0.01 | 0.05 |
| 14** | TiO$_2$ (4.76) | carbon black (0.0086) | <0.01 | <0.01 |

*= comparative sample according to EP-B-1 970 181
**= comparative sample according to JP-B-3 112 086

Example 7

The concentrates in example 6 were used to produce polyester (PET) preforms (Invista T94N resin, IV=0.84 dl/g). 25 g preforms for 0.5 litre bottles with PCO neck finish were produced using an Arburg Allrounder 320, equipped with a Piovan T200 dryer and DB-60 control unit, with extruder temperature profile and hot runner temperatures set at 285° C. PET was dried to a dew point of −45° C. Dosing of the concentrates was done using a Movacolor MCBalance. Preforms were heated on a Corpoplast LB01 using the same PET bottle blowing settings for all preforms.

Figure 6:
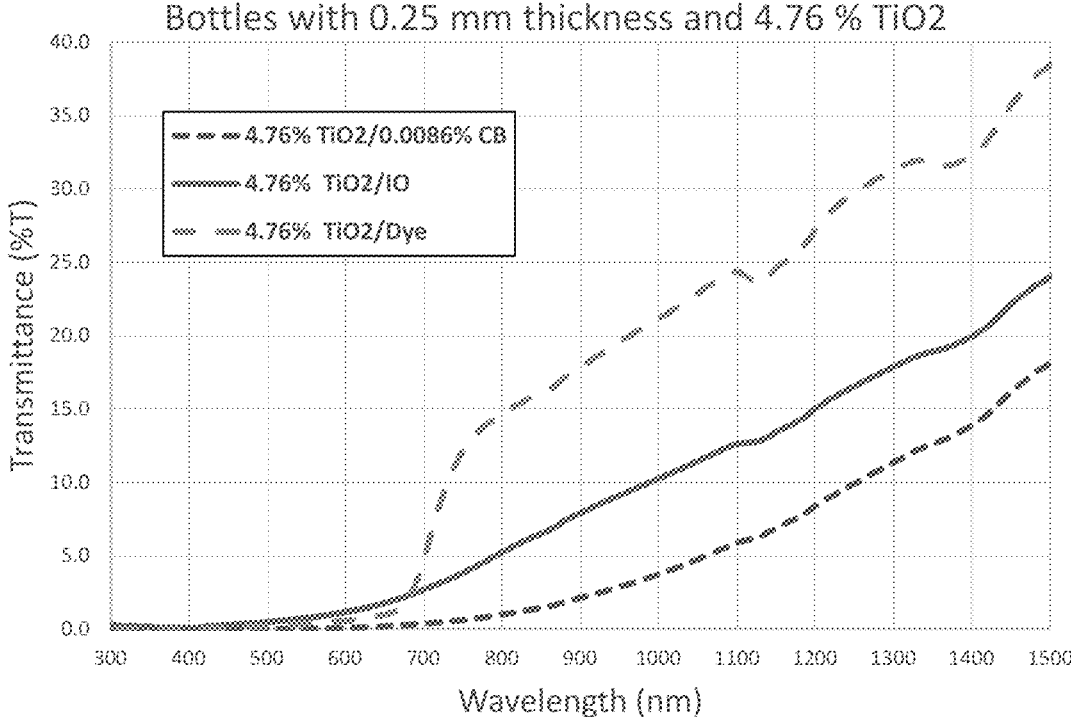
FIG. 6 depicts the transmittance curves of bottles with 0.25 mm thickness and 4.76% $TiO_2$. The plots are of 4.76% $TiO_2$/0.0086% CB; 4.76% $TiO_2$/IO; and 4.76% $TiO_2$/dye.
Figure 7:
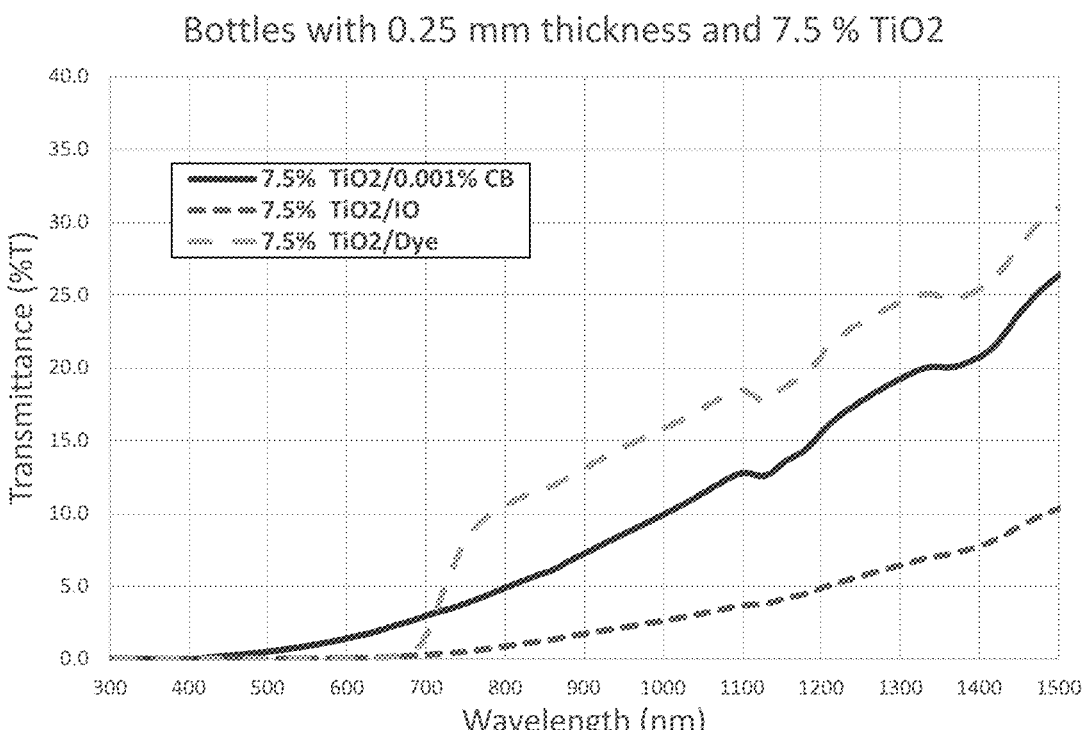
FIG. 7 depicts the transmittance curves of bottles with 0.25 mm thickness and 7.5% $TiO_2$. 7.5% $TiO_2$/0.001% CB; 7.5% $TiO_2$/IO; and 7.5% $TiO_2$/dye.

Transmittance curves from 300 to 1700 nm of the preforms with a thickness of 0.25 mm were collected using a Shimadzu UV3600 plus spectrometer equipped with an ISR 1503 integrating sphere and are plotted in FIGS. 6 and 7. Table 7 shows the transmittance values of the preforms at 550 and 1300 nm. Clearly it can be seen that comparative examples 12 and 13 have a transmittance of >0.1% at 550 nm. In view of comparative example 14, by using more carbon black the preform becomes more grey, is more difficult to blow mould, and has a weak transmittance at 1300 nm.

TABLE 7

| Sample | Opacifier (wt. %) | Light absorber (wt. %) | % T @ 550 nm | % T @ 1300 nm |
|---|---|---|---|---|
| 8 | TiO$_2$ (4.76) | iron oxide (0.031) | 0.8 | 17.9 |
| 9 | TiO$_2$ (4.76) | dyes (0.014) | 0.5 | 33.8 |
| 10 | TiO$_2$ (7.5) | iron oxide (0.049) | 0.04 | 6.5 |
| 11 | TiO$_2$ (7.5) | dyes (0.022) | 0.05 | 25.4 |
| 12* | TiO$_2$ (7.5) | carbon black (0.001) | 0.9 | 19.3 |
| 13* | TiO$_2$ (10.5) | carbon black (0.001) | 0.4 | 15.2 |
| 14** | TiO$_2$ (4.76) | carbon black (0.0086) | 0.04 | 11.4 |

*= comparative sample according to EP-B-1 970 181
**= comparative sample according to JP-B-3 112 086

The invention claimed is:

1. A preform for a container, said preform comprising:
a polyester in an amount of 80% or more by total weight of the preform,
titanium dioxide pigment in an amount of 0.5% or more by total weight of the preform,
a light absorbing additive;
wherein said preform has a transmittance at 550 nm of 0.1% or less and a transmittance at 1300 nm of 0.5% or more,
wherein the transmittance is measured at 2 mm sample thickness and the transmittance is determined from transmission curves collected using a spectrometer equipped with an integrating sphere.

2. A preform for a container, said preform comprising:
a polyester in an amount of 80% or more by total weight of the preform,
titanium dioxide pigment in an amount of 0.5% or more by total weight of the preform,
a light absorbing additive;
wherein said preform has an absorption (%) at 550 nm of 25% or more and an absorption (%) at 1300 nm of 20% or less, wherein the absorption (%) is measured at 2 mm sample thickness,
wherein absorption (%)=100%−transmittance (%)−reflection (%),
wherein reflection refers to the percentage of light that is reflected by the sample, and
wherein transmission and reflection are determined from transmission curves collected using a spectrometer equipped with an integrating sphere.

3. The preform for a container of claim 1, wherein the transmittance at 1300 nm of said preform is at least 0.5 percentage point more than the transmittance at 550 nm of said preform.

4. The preform for a container of claim 2, wherein the absorption at 1300 nm of said preform is at least 10 percentage points less than the absorption at 550 nm of said preform.

5. The preform for a container of claim 1, wherein the polyester comprises one or more selected from the group consisting of polyethylene terephthalate, virgin bottle grade polyethylene terephthalate, postconsumer polyethylene terephthalate, polyethylene terephthalate glycol-modified (PETG), polyethylene naphthalate, polybutylene terephthalate, polyethylene furanoate, and polylactic acid.

6. The preform for a container of claim 1, wherein the light absorbing additive comprises a pigment.

7. The preform for a container of claim 1, wherein the light absorbing additive comprises a dye.

8. The preform for a container of claim 1, wherein the light absorbing additive comprises one or more organic compounds selected from the group consisting of Solvent Yellow 43 (CAS number 19125-99-6/1226-96-9), Solvent Yellow 72 (CAS number 61813-98-7), Solvent Yellow 93 (CAS number 4702-90-3/61969-52-6), Solvent Yellow 114 (CAS number 75216-45-4), Disperse Yellow 64 (CAS number 10319-14-9), Disperse Yellow 201 (CAS number 80748-21-6), Disperse Yellow 241 (CAS number 83249-52-9), Solvent Violet 36 (CAS number 61951-89-1), Solvent Red 23 (CAS number 85-86-9), Solvent Red 26 (CAS number 477-79-6), Solvent Red 111 (CAS number 82-38-2), Solvent Red 135 (CAS number 71902-17-5), Solvent Red 149 (CAS number 71902-18-6/21295-57-8), Solvent Red 179 (CAS number 89106-94-5), Solvent Red 195 (CAS number 164251-88-1), Solvent Red 207 (CAS number 15958-68-6), Solvent Green 3 (CAS number 128-80-3), Solvent Green 28 (CAS number 71839-01-5), Disperse Blue 60 (CAS number 12217-80-0), Solvent Blue 36 (CAS number 14233-37-5), Solvent Blue 97 (CAS number 61969-44-6), Solvent Blue 101 (CAS number 6737-68-4), Solvent Blue 104 (CAS number 116-75-6), Solvent Orange 60 (CAS number 61969-47-9/6925-69-5), Disperse Orange 47 (CAS number 12236-04-2), Solvent Black 7 (CI number 50415:1, CAS number 8005-02-5), Pigment Blue 15:1 (CI number 74160, CAS number 147-14-8), Pigment Blue 15:3 (CI number 74160, CAS number 147-14-8), Pigment Green 7 (CI number 74260, CAS number 1328-53-6), Pigment Orange 43 (CI number 71105, CAS number 4424-06-0), Pigment Orange 64 (CI number 12760, CAS number 72102-84-2), Pigment Orange 72 (CI number 211095, CAS number 78245-94-0), Pigment Red 122 (CI number 73915, CAS number 980-26-7), Pigment Red 144 (CI number 20735, CAS number 5280-78-4), Pigment Red 149 (CI number 71137, CAS number 4948-15-6), Pigment Red 177 (CI number 65300, CAS number 4051-63-2), Pigment Red 178 (CI number 71155, CAS number 3049-71-6), Pigment Red 179 (CI number 71130, CAS number 5521-31-3), Pigment Red 187 (CI number 12486, CAS number 59487-23-9), Pigment Red 202 (CI number 73907, CAS number 3089-17-6), Pigment Red 214 (CI number 200660, CAS number 40618-31-3), Pigment Red 220 (CI number 20055, CAS number 68259-05-2), Pigment Red 242 (CI number 20067, CAS number 52238-92-3), Pigment Red 247 (CI number 15915, CAS number 43035-18-3), Pigment Red 254 (CI number 56110, CAS number 84632-65-5), Pigment Red 264 (CI number 561300, CAS number 88949-33-1), Pigment Violet 19 (CI number 73900, CAS number 1047-16-1), Pigment Violet 23 (CI number 51319, CAS number 6358-30-1), Pigment Violet 29 (CI number 71129, CAS number 81-33-3), Pigment Yellow 109 (CI number 56284, CAS number 5045-40-9), Pigment Yellow 110 (CI number 56280, CAS number 5590-18-1), Pigment Yellow 119 (CI number 77496, CAS number 68187-51-9), Pigment Yellow 128 (CI number 20037, CAS number 79953-85-8), Pigment Yellow 138 (CI number 56300, CAS number 30125-47-4), Pigment Yellow 147 (CI number 60645, CAS number 4118-16-5), Pigment Yellow 151 (CI number 13980, CAS number 31837-42-0), Pigment Yellow 180 (CI number 21290, CAS number 77804-81-0), Pigment Yellow 181 (CI number 11777, CAS number 74441-05-7), Pigment Yellow 183 (CI number 18792, CAS number 65212-77-3), Pigment Yellow 191 (CI number 18795, CAS number 129423-54-7), Pigment Yellow 53 (CI number 77788, CAS number 8007-18-9), Pigment Yellow 62 (CI number 13940, CAS number 12286-66-7), Pigment Yellow 95 (CI number 20034, CAS number 5280-80-8), and Pigment Blue 60 (CI number 69800, CAS number 81-77-6); or one or more inorganic compounds selected from the group consisting of Pigment Black 26 (CI number 77494, CAS number 68186-94-7), Pigment Brown 24 (CI number 77310, CAS number 68186-90-3), Pigment Brown 29 (CI number 77500, CAS number 12737-27-8), Pigment Green 36 (CI number 74265, CAS number 14302-13-7), Pigment Green 50 (CI number 77377, CAS number 68186-85-6), Pigment Red 101 (CI number 77491, CAS number 1332-37-2), Pigment Black 28 (CI number 77428, CAS number 68186-91-4), Pigment Black 29 (CI number 77498, CAS number 68187-50-8), Pigment Black 30 (CI number 77504, CAS number 71631-15-7), Pigment Black 33 (CI number 77537, CAS number 68186-94-7 or 75864-23-2), Pigment Brown 29 (CI number 77500, CAS number 12737-27-8), Pigment Brown 33 (CI number 77503, CAS number 68186-88-9), Pigment Blue 29 (CI number 77007, CAS number 057455-37-5), Pigment Blue 28 (CI number 77346, CAS number 1345-16-0), Pigment Blue 36 (CI number 77343, CAS number 68187-11-1), Pigment Green 17 (CI number 77288, CAS number 1308-38-9), Pigment Yellow 164 (CI number 77899, CAS number 68412-38-4), Pigment Yellow 184 (CI number 771740, CAS number 14059-33-7), Pigment Yellow 42 (CI number 77492, CAS number 51274-00-1), and oxides comprising metals or elements selected from the group consisting of Na, Al, Si, S, Zn, Ni, Fe, Mn, Ti, V, Bi, Co, Cr, Cu, Sn, and Sb; or any mixture thereof.

9. The preform for a container of claim 1, further comprising polymethylpentene.

10. The preform for a container of claim 1, further comprising cyclic olefin polymer.

11. The preform for a container of claim 10, wherein the cyclic olefin polymer comprises one or more cyclic olefin copolymers.

12. The preform for a container of claim 10, wherein the cyclic olefin polymer comprises one or more cyclic olefin homopolymers.

13. The preform for a container of claim 10, wherein the cyclic olefin polymer comprises one or more selected from the group consisting of ethylene-norbornene copolymer, ethylene-phenyl norbornene copolymer, ethylene-tetracyclododecene norbornene copolymer, ethylene-dicyclopentadiene copolymer, norbornene homopolymer, phenyl norbornene homopolymer, tetracyclododecene norbornene homopolymer, and dicyclopentadiene homopolymer.

14. The preform for a container of claim 1, further comprising polymethylpentene and/or cyclic olefin polymer, wherein the total amount of polymethylpentene and/or cyclic olefin polymer together is 5% or less, based on the total weight of the preform.

15. The preform for a container of claim 1, wherein the amount of titanium dioxide pigment is 8% or less, based on the total weight of the preform.

16. The preform for a container of claim 1, comprising a layer, wherein the polyester, the titanium dioxide pigment, the light absorbing additive, and optional polymethylpentene and/or cyclic olefin polymer, are comprised in said layer.

17. A process for preparing a polyester-based container, said process comprising the steps of:

heating the preform of claim 1 using a near-infrared (NIR) radiation source, and moulding the preform into a container.

18. The process of claim 17, wherein the preform is heated to 80-130° C.

19. The process of claim 17, wherein the preform is blow moulded into a container.

20. The process of claim 17, wherein the temperature difference between the outside of the preform, which faces the NIR radiation source, and the inside of the preform is 20° C. or less during said heating, wherein the temperature difference is measured on a preform of 3 mm thickness.

21. A polyester-based container obtainable by the process of claim 17.

22. The container of claim 21, having a transmittance at 550 nm of 1% or less, when measured at 0.25 mm sample thickness.

* * * * *